July 20, 1965        R. R. CARNEY ETAL        3,195,564
VACUUM-INSULATED VALVE FOR CRYOGENIC FLUIDS
Original Filed Feb. 16, 1961

INVENTORS
RICHARD R. CARNEY
FRANK D. BOND, Jr.
BY
Richard S. Shreve Jr
ATTORNEY

United States Patent Office 3,195,564
Patented July 20, 1965

1

3,195,564
VACUUM-INSULATED VALVE FOR CRYOGENIC FLUIDS
Richard R. Carney and Frank D. Bond, Jr., Kenmore, N.Y., assignors to Union Carbide Corporation, a corporation of New York
Continuation of application Ser. No. 89,809, Feb. 16, 1961. This application Oct. 1, 1962, Ser. No. 227,978
6 Claims. (Cl. 137—375)

This is a continuation of our application Serial No. 89,809, filed February 16, 1961, now abandoned.

This invention relates to vacuum-insulated valves and more particularly to vacuum-insulated, manual shut-off valves for use in handling cryogenic fluids at low or moderate pressures. In transferring, handling, and storing liquefied gases, such as helium, hydrogen, and neon, special precautions must be taken in order to avoid considerable losses due to evaporation and, in the case of liquid hydrogen hazards such as possible combustion and explosion.

It is the principal object of this invention to provide a valve especially useful in the transferring, handling and storing of low-temperature liquefied gases.

Other objects are to provide a valve which features positive, tight shut-off under all temperature conditions and low evaporation losses to accomplish cooldown as well as relatively low evaporation losses due to heat conduction.

Other objects and advantages of the invention will become apparent upon reference to the specification and drawings in which.

Figure 1:
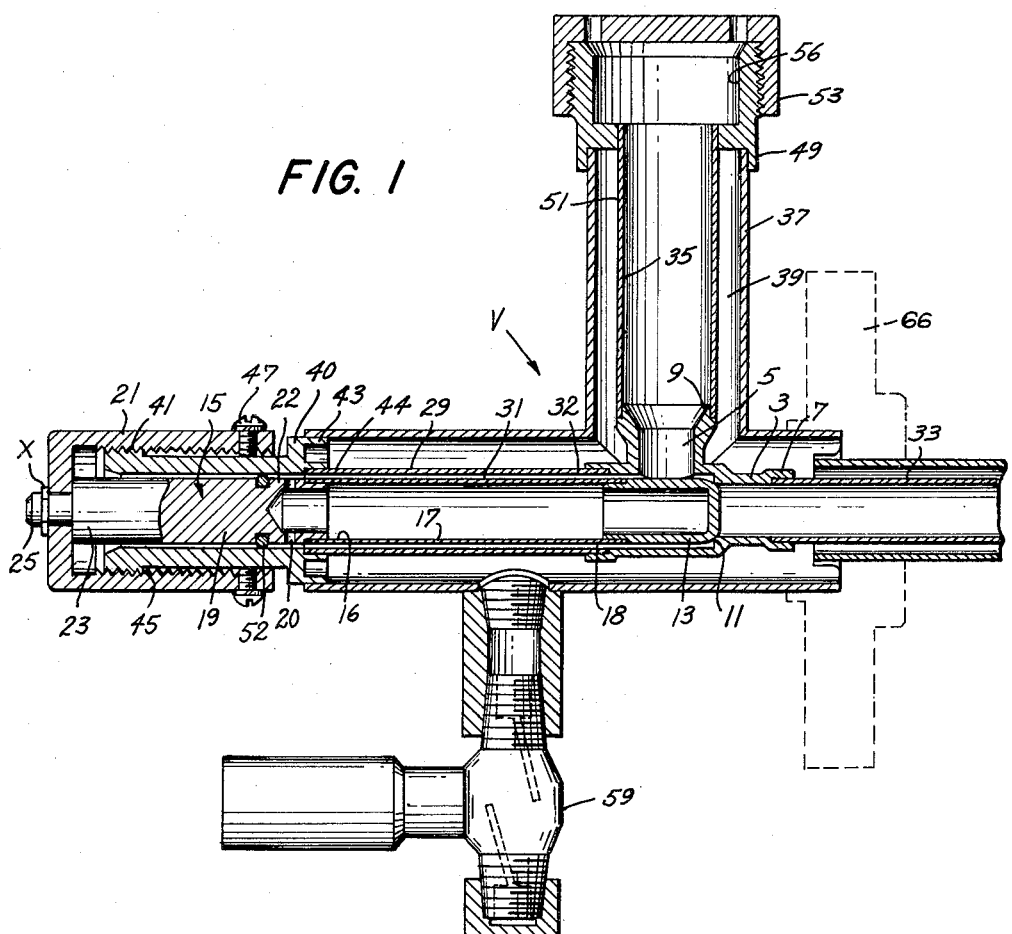
FIGURE 1 is a cross-section view of the preferred embodiment of the invention.

There has long been a need in the art for a valve which would provide in a cryogenic liquid application at temperatures below 200° K. all the essential features of the conventional gas cylinder valve, such as:

(a) Convenient filling and withdrawal of product,
(b) Positive, tight closure against leakage,
(c) Adequate body strength to prevent distortion,
(d) Convenient throttling of flow, and also provide for low product loss by evaporation from cooldown of the inner parts and normal heat leak.

Being able to accomplish cooldown of the inner parts of a valve with minimum evaporation losses is particularly important for a valve which is used repeatedly for batch type transfer of cryogenic liquids, which requires short periods of use separated by longer periods of time during which the valve usually warms up to near ambient temperature. Typical of this type of operation is filling small containers periodically from a larger container. Under these conditions, the evaporation losses necessary to accomplish valve cooldown may constitute a considerable portion of the total liquid handling losses. While reducing the heat conduction through the cold valve parts is also important for achieving low liquid handling losses, it is usually a less important design consideration under intermittent use conditions than achieving minimum valve cooldown losses.

2

Attempts to design low temperature manual valves have been made by enclosing a conventional angle or globe type valve within a vacuum jacket. A principal disadvantage of this combination was that the inner valve parts were relatively massive and thus caused high liquid evaporation losses to accomplish cooldown, as well as high evaporation losses due to normal heat leak into the product fluid through the solid stem, supports, etc. Another important problem was a tendency for the valve to stick upon cooldown to liquid hydrogen or helium temperature, due to air being solidified between mating parts. Also, the resulting valve was relatively large, bulky, and costly for a particular size valve opening, and it was difficult to maintain a desirably low absolute pressure (vacuum) within the insulation casing, largely because the inner valve body is usually a casting and is thus usually slightly porous.

The valve of the invention overcomes these difficulties by employing a vacuum jacket somewhat heavier than required to withstand vacuum loading alone and cooperates to add strength and regidity to the inner valve body and stem parts, since in order to secure low cooldown mass, these inner parts are made more thin and delicate than desirable to function satisfactorily if used alone. As a result of this cooperation, the resulting mass of the combined cold parts is quite small and is less than used for most non-vacuum insulated valves for similar pressure service. Also, heat conduction through the cold valve parts is made quite small.

The valve of this invention is designed to fulfill two functions important in cryogenic applications, namely, (a) the valving or shut-off function, and (b) the piping connection or bayonet function.

The preferred embodiment of the valve will be described more specifically referring to FIGURE 1:

The valve noted generally by the letter V includes an angle inner valve body 3 having a passage 5 which includes an inlet portion 7 and an outlet portion 9. The inlet portion 7 terminates in a valve seat 11. The valve seat 11 has a sharp or slightly beveled edge for receiving a hollow plug member 13. The hollow plug member 13 forms the front section of the extended valve member assembly 15 which includes an elongated inner tubular member 17 attached at one end 18 to said hollow plug member 13 by welding or silver brazing for example. A valve stem extension member 19 is attached to the other end 16 of elongated inner tubular member 17. The valve stem extension member 19 has one or more apertures 20 in its forward end 22 which is attached to said inner tubular member 17. Apertures 20 may also be in the other end 16 of member 17 if desired. The extended valve member assembly 15 is operated manually by an internally threaded knob 21 which is attached to the valve stem extension member 19 at its rearward end 23 by a suitable connection, such as projection 25 and a snap ring. The length and wall thickness of the inner elongated tubular member 17 and valve stem extension member 19 is whatever required to reduce the heat conduction therethrough to a desirably low value, and may depend somewhat upon the cryogenic fluid to be handled. For example, an extension of about 3 inches with .020 inch thick wall is sufficient to prevent frosting of the valve parts for liquid hydrogen service. If desired, other methods of operating the valve plug besides screw threads could be used, such as a mechanical lever arrangement, or by pneumatic or electrical means.

Figure 2:
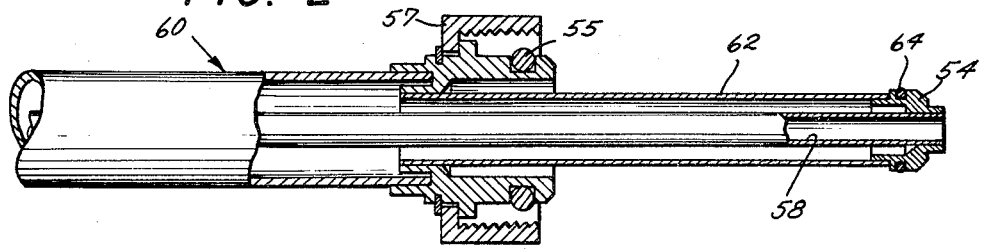
FIGURE 2 is a view partially in cross-section of a hose which can be coupled to the invention valve.

An outer tubular member 29 concentrically arranged with inner tubular member 17 and defining therewith an annular space 31 communicating with apertures 20 is attached at one end 32 to inner valve body 3. A first extension tube 33 is connected to the inlet end 7 of inner valve body 3 and a second extension tube 35 is connected to the outlet portion 9 of inner valve body 3. A vacuum jacket 37 surrounds and defines a vacuum space 39 with said inner valve body 3 and substantially the entire length of inner and outer tubular members 17 and 29 and said first and second extension tubes 33 and 35. The inner valve body 3 is attached to and supported by vacuum jacket 37 through outer tubular member 29 to adaptor 40. Adaptor 40 has an externally threaded body section 41 and a front section 43. The front section 43 forms a seal between vacuum jacket 37 and the outer end 44 of tubular member 29. The externally threaded section 41 cooperates with the internally threaded knob 21 to transmit motion to said extended valve assembly 15. Further, adaptor 40 is provided with a shoulder 45 and knob 21 is provided with a screw 47 which cooperate to limit the rearward motion of said valve assembly 15. Said inner valve body 3 is also attached to said vacuum jacket 37 by an outlet connection 49 provided at the outer end 51 of said second extension tube 35. Such connection seals off the vacuum space 39 defined by the vacuum jacket 37 and the tube 35 and provides means for receiving a mating connection such as shown in FIGURE 2.

While this valve may be used in any application for handling cryogenic fluids, it is especially useful for attachment onto vacuum-insulated containers for liquefied gases where usage of the valve will be intermittent, and its smaller heat capacity requires much lower evaporation losses to accomplish repetitive cooldown with expensive cryogenic liquids. For such preferred use, an adaptor flange 66 may be provided for attaching the valve to the container.

In order to make this valve assembly easily removable from a container, such as for repair or replacement, the vacuum space 39 is preferably separate from that of the container, and is evacuated through shut-off connection or valve 59, which may be located in any convenient location. If desired, an adsorbent or getter material may be used to assist in maintaining a desirably low absolute pressure. The required pressure seal between the extended stem 19 and adaptor 40 is preferably effected by O ring 52, located near the outer or warm end, which moves axially as the valve is opened. Also, other equivalent seal arrangements could be used.

An important feature of this valve design is the means used for purging air from the annular space surrounding the hollow stem following make-up of the connecting hose assembly. This problem exists because atmospheric air surrounds the stem whenever the valve is closed and the hose connection removed. Upon make-up of the hose and cooldown of the valve to liquid hydrogen or helium temperature, this air would solidify and could cause sticking or freeze-up of the stem, thus making the valve inoperative. To prevent such freeze-up, one or more apertures 20 are drilled through the hollow stem near the warm end. Upon cooldown of the valve, after making the mating hose connection, the forward or inner end of hollow plug 13 cools first and will condense and solidify the air within the plug. The resulting increase in air density therein serves to draw within the hollow plug the air surrounding it, so that this air is thereby replaced with product gas, such as hydrogen or helium. This automatic air purge feature provides a non-sticking valve. Alternate ways to provide for purging of air from the valve, such as external venting, were tried, but were considered unnecessary when the automatic purge feature described was incorporated.

As was mentioned above, the second function of the invention is the piping connection or bayonet function. This latter function will now be described. At the outlet side of the valve V, the vacuum jacket 37 and the second extension tube 35 are extended and terminate in an externally threaded outlet connection 49 which is intended to receive a mating tubular connection. When not in use, connection 49 may be covered by screwed cap 53 for protection. Such mating connection may be a vacuum-insulated hose used for product filling and withdrawal purposes, as shown in FIGURE 2. Also, the mating connection may be a section of vacuum-insulated piping permanently connected thereto, as by welding.

This valve and mating connection design provides for sealing at two locations, as shown on FIGURE 2. A relatively tight primary semi-seal is initially effected at inner body 3 by nosepiece 54 mating with the tapered metal parts. The purpose of this primary seal is to close off the majority of the possible leakage of liquid. A secondary, ambient temperature seal is provided within outlet connection 49 by O ring 55, which seals against the inner cylindrical surface 56 of connection 49. The secondary seal at connection 49 is sufficiently far removed from the primary seal at 3 to prevent frosting of ring nut 57, which is used to attach the hose to the valve.

The inside diameter of the inner tube 58 of mating hose assembly 60 may be selected according to its intended usage. For filling the container or for emptying the entire contents of the container relatively quickly at one time, this inside diameter of this inner tube is preferably the same as or may be larger than the valve seat diameter opening. However, for withdrawal of small quantities of liquid from the container at one time such as transfer to a smaller container or experimental apparatus, a smaller inside tube diameter is usually preferable because its heat content as well as its cost usually will be less. The smaller tube diameter will also usually be more flexible and convenient to use. In all cases, outer tube 62 must be sufficiently strong to withstand the external pressure loading encountered without noticeable distortion. Also, if desired, one or more sealing rings 64 may be added to the outside diameter of nosepiece 54 to secure to a more positive seal.

While this valve and mating hose assembly may be used for handling any fluid, it is especially useful for handling very low-boiling cryogenic liquids, such as liquid hydrogen, helium, and neon.

The valve body parts are preferably fabricated of one material by welding or brazing. Type 304 stainless steel has been found ideally suited to these requirements, which include:

(1) High strength and ductility at low cryogenic temperatures
(2) Low heat conductivity, low specific heat, and low cost
(3) Good weldability
(4) Good corrosion resistance
(5) Low porosity, enabling good quality vacuum to be maintained for long periods.

The O ring seals are preferably made of a soft, pliable material, such as neoprene or silicone rubber. The sealing rings may be made of metal or plastic, or of various combinations thereof.

While this valve may be operated in any position, it is preferably to have the valve stem either in a vertical position or inclined upward. Liquid is thus prevented from recirculating in the annular area 31 outside the stem when the valve is open and possibly damaging the O ring seal at the warm end of the valve stem during liquid transfer operations, and also adding to evaporation losses due to heat leak.

One important advantage of this valve over certain other valves for cryogenic fluid is that shut-off of this manually operated valve may be more positive than for a valve actuated by a removable probe means, and still obtain satisfactorily low cooldown and heat leak losses. Also, it can be more easily used for throttling operations. Positive control is always conveniently available without valve sticking, even during prolonged transfer periods. Also, since it uses a rising-stem type design, the degree of valve opening is always clearly indicated externally.

Another advantage of this valve design over a conventional manual valve with vacuum casing added is that this inner valve body is welded or brazed into one-piece construction and has no removable joints. The unit is thus more vacuum-tight. This is accomplished by making the top gland adaptor 40 a common part to both the inner valve body 3 and vacuum casing 37.

Figure 3:
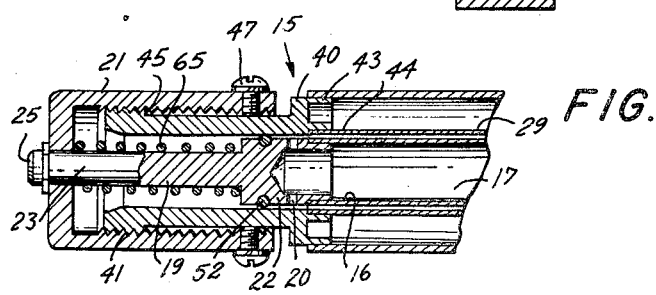
FIGURE 3 is a cross-section of a modification of the invention.

As noted above, inner tubular member 17 and second extension tube 35 consist of thin wall metal tubes for low heat conduction. For this reason, these parts are somewhat fragile and could be damaged if excessive closing torque and/or force were applied to them by manual knob 21, or by other operating means. To limit the maximum closing force or torque applied, compression spring 65 may be installed at a warm location as shown on FIGURE 3. This spring is also useful in maintaining the desired plug seating force within the valve as the various parts contract and expand due to temperature changes, and may prevent possible buckling of tube 17 if the valve is closed when cold, and subsequently warms up to near ambient temperature.

Metal-to-metal seating will usually be used, with the mating surfaces ground and/or lapped as required for tight shut-off. However, to avoid such precise machining operations, the plug may be faced with a softer material, either metal (e.g. brass, bronze, or aluminum) or plastic (e.g. Teflon or Kel-F). Alternately, a removable seat of similar materials may be used.

Although an angle valve embodiment is shown in FIGURE 1, the essential features of this valve design could also be employed for a globe type valve or even a gate type valve arrangement.

The construction of this valve could also be modified in other ways, such as:

(1) While use of an O ring with a non-rotative stem is the preferred seal arrangement, other seal arrangements could be used. A packing compressed by means of a packing ring could be used, which would require internal threads and additional mating parts, thus making vacuum-insulated construction more difficult. Use of an O ring seal eliminates the need for the packing nut or other compression member.

(2) In order to keep the hose bayonet connection tight during liquid transfer, a spring element may also be used under ring nut 57. This spring, which is installed in a relatively warm location, also serves to limit the closing force which may be applied by the ring nut and thus prevents buckling of the extended outer bayonet tube 62 by overtightening of the ring nut.

While the invention has been described by referring to a preferred embodiment, it is to be understood that certain modifications may be made without departing from the spirit and scope of the invention.

What is claimed is:

1. A vacuum-insulated valve for cryogenic fluids at temperatures below 200° K., comprising an inner valve body provided with passage means having an inlet and outlet for flow of said cryogenic fluids through said inner valve body; a valve seat in said inner valve body and positioned in said passage means; an elongated outer tubular member attached at one end to said inner valve body; an extended valve member having a back section and a hollow front section, said front section defining with said outer tubular member a purgable annular chamber and being adapted to register with said valve seat to cause positive shut-off of the flow of fluids through said passage means; said passage means communicating with said purgable annular chamber even when said front section is in registry with said valve seat; a first extension tube connected to said inlet of said passage means; a second extension tube connected to said outlet of said passage means; a vacuum jacket surrounding and defining a vacuum space with said inner valve body, substantially the entire length of said extended valve member and at least partially said first and second extension tubes; and motion transmitting means connected to said extended valve member at said back section of said extended valve member.

2. A vacuum-insulated valve for cryogenic fluids at temperatures below 200° K., comprising an inner valve body provided with passage means having an inlet and outlet for flow of said cryogenic fluids through said inner valve body; a valve seat in said inner valve body and positioned in said passage means; an elongated outer tubular member attached at one end to said inner valve body; and extended valve member having a back section and a hollow front section, said front section defining with said outer tubular member a purgeable annular chamber and being adapted to register with said valve seat to cause positive shut-off of the flow of fluids through said passage means; means provided on said hollow front section to permit communication between such section and said purgeable annular chamber; a first extension tube connected to said inlet of said passage means; a second extension tube connected to said outlet of said passage means; a vacuum jacket surrounding and defining a vacuum space with said inner valve body, substantially the entire length of said extended valve member and at least partially said first and second extension tubes; and motion transmitting means connected to said extended valve member at said back section of said extended valve member.

3. A vacuum-insulated valve for cryogenic fluids comprising an inner valve body provided with passage means having an inlet and outlet for flow of said cryogenic fluids through said inner valve body; a valve seat in said valve body and positioned in said passage means; an elongated outer tubular member attached at one end to said inner valve body; an extended valve member comprising a hollow plug member adapted to register with said valve seat; an elongated inner tubular member disposed within said outer tubular member so as to define therewith an elongated purgeable annular chamber and said inner tubular member being fixed at one end to said hollow plug member; and a valve stem extension member attached to the other end of said inner tubular member and at least one aperture providing communication between said annular chamber and said inner tubular member; a first extension tube connected to said inlet of said passage means; a second extension tube connected at one end to said outlet of said passage means; a vacuum jacket surrounding and defining a vacuum space with said inner valve body and substantially the entire length of said inner and outer tubular members and said first and second extension tubes; an adaptor member having an externally threaded elongated body section and a front section forming a seal between said vacuum jacket and the other end of said elongated outer tubular member; pressure seal means located between said valve stem extension member and said adaptor; and an internally threaded cap fitting over said externally threaded body section of said adaptor and being fastened to said extended valve member at said valve stem extension for transmitting motion to said extended valve; an outlet connection attached to the other end of said second extension tube and said vacuum jacket surrounding said second extension tube thereby sealing the said vacuum space defined by said vacuum jacket and second extension tube.

4. Apparatus according to claim 3 wherein said inner valve body is provided with passage means wherein said inlet and outlet are at right angles to each other and said pressure seal means is an O ring.

5. Apparatus according to claim 4 including an internal compression spring cooperating between said internally threaded cap and said valve stem extension member.

6. Apparatus according to claim 2 and including a hose assembly having an apertured nose piece adapted to cooperate with said inner valve body for forming a primary seal therebetween; an inner tube communicating at one end with said valve body through said apertured nose piece, sealing means spaced from said apertured nose piece and adapted to cooperate with said outlet connection for forming a secondary seal and attaching means for connecting said hose assembly to said valve.

References Cited by the Examiner

UNITED STATES PATENTS

| 2,202,735 | 5/40 | Johnson | 137—375 |
| 2,831,326 | 4/58 | Richards et al. | 137—375 |
| 2,858,146 | 10/58 | Bleyle | 251—96 |

FOREIGN PATENTS 1,249,396  11/60  France.

M. CARY NELSON, *Primary Examiner.*